United States Patent
Bong

(10) Patent No.: US 9,897,061 B2
(45) Date of Patent: Feb. 20, 2018

(54) METHOD FOR CONTROLLING ENGINE KNOCKING

(71) Applicant: Hyundai Motor Company, Seoul (KR)

(72) Inventor: Ha Dong Bong, Gwangmyeong-si (KR)

(73) Assignee: Hyundai Motor Company, Seoul (KR)

( * ) Notice: Subject to any disclaimer, the term of this patent is extended or adjusted under 35 U.S.C. 154(b) by 189 days.

(21) Appl. No.: 14/936,530

(22) Filed: Nov. 9, 2015

(65) Prior Publication Data

US 2016/0341171 A1 Nov. 24, 2016

(30) Foreign Application Priority Data

May 21, 2015 (KR) .......................... 10-2015-0070854

(51) Int. Cl.
*F02P 5/152* (2006.01)
*F02P 5/15* (2006.01)
*G01L 23/22* (2006.01)

(52) U.S. Cl.
CPC .............. *F02P 5/152* (2013.01); *F02P 5/15* (2013.01); *G01L 23/22* (2013.01)

(58) Field of Classification Search
CPC .............. F02P 5/152; F02P 5/15; G01L 23/22
USPC ...................................... 123/406.21, 406.32
See application file for complete search history.

(56) References Cited

U.S. PATENT DOCUMENTS

2009/0031989 A1\* 2/2009 Sato ..................... F02P 5/152
123/406.33

FOREIGN PATENT DOCUMENTS

| JP | 08-42434 A | 2/1996 |
|---|---|---|
| JP | 2007-132218 A | 5/2007 |
| JP | 2011-012569 A | 1/2011 |
| JP | 2011-226297 A | 11/2011 |
| JP | 2012-072718 A | 4/2012 |
| JP | 2012-097595 A | 5/2012 |
| JP | 5645573 B2 | 11/2014 |
| KR | 10-0213171 B1 | 8/1999 |
| KR | 10-2004-0048130 A | 6/2004 |
| KR | 10-2005-0119859 A | 12/2005 |
| KR | 10-0634595 B1 | 10/2006 |
| KR | 10-2013-0003116 A | 1/2013 |

\* cited by examiner

*Primary Examiner* — Mahmoud Gimie
(74) *Attorney, Agent, or Firm* — McDermott Will & Emery LLP

(57) ABSTRACT

A method for controlling engine knocking, in which a retarded timing is recovered based on a retarded timing amount learned when the engine knocking occurs during driving of a vehicle, includes a first process of retarding an ignition timing based on the previously learned retarded timing amount in a reference engine operating condition entered during driving of the vehicle. A second process recovers the retarded timing when a first condition in which a time duration acquired by accumulating a driving time under the reference engine operating condition is equal to or more than a reference time duration and a second condition in which the engine knocking does not occur while driving under the reference engine operating condition are satisfied.

7 Claims, 1 Drawing Sheet

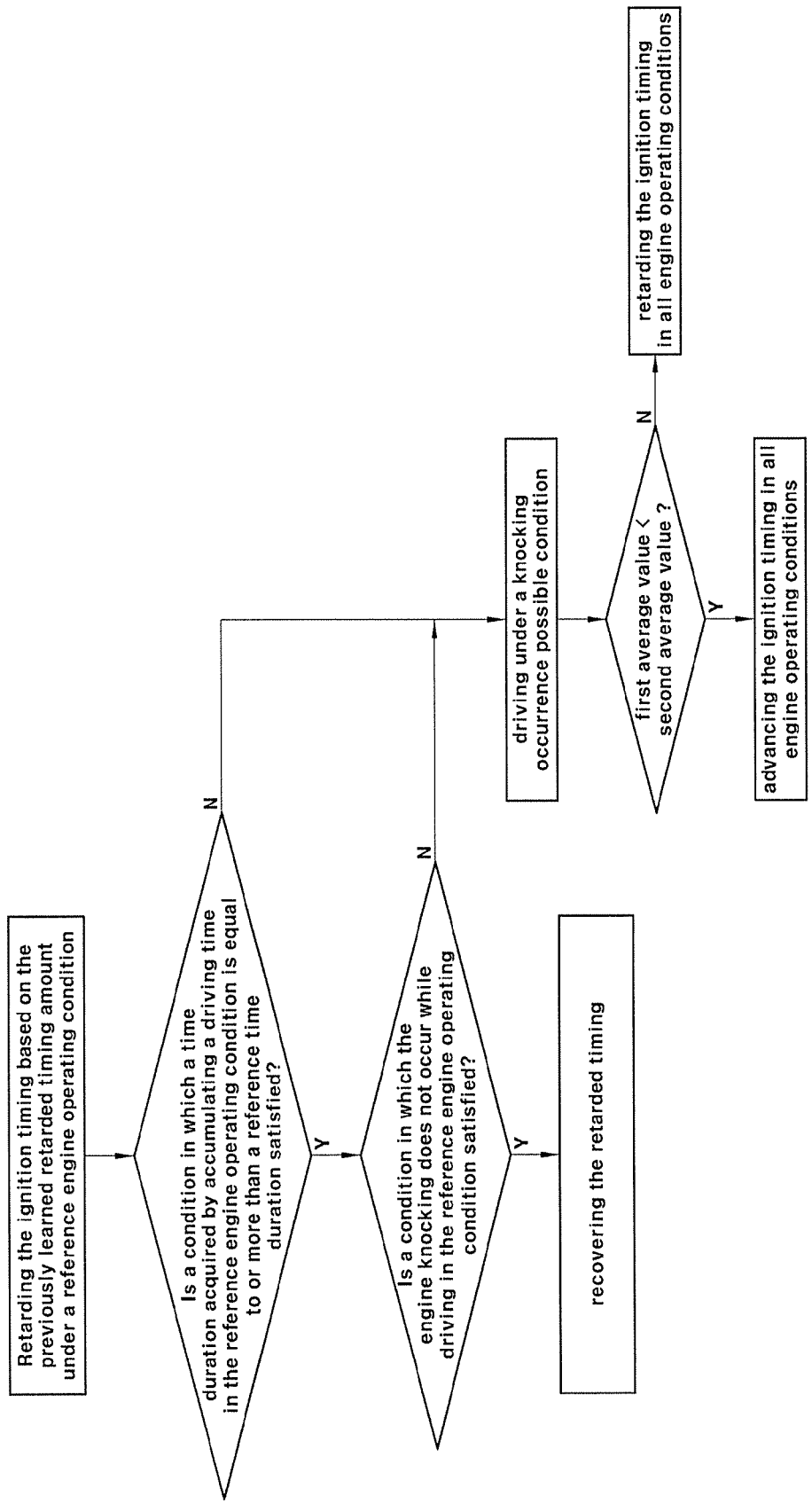

METHOD FOR CONTROLLING ENGINE KNOCKING

CROSS-REFERENCE TO RELATED APPLICATION

This application claims under 35 U.S.C. § 119(a) the benefit of priority to Korean Patent Application No. 10-2015-0070854 filed on May 21, 2015, the entire content of which is incorporated herein by reference.

TECHNICAL FIELD

The present disclosure relates to a method for controlling engine knocking, and more particularly, to a method for controlling engine knocking, capable of recovering retarded timing by learning the retarded timing when the engine knocking occurs.

BACKGROUND

In general, a gasoline engine particularly requires knock control in order to maximize engine performance. Therefore, an engine control unit (ECU) of a vehicle determines whether engine knocking occurs by checking a signal detected through a knocking sensor, and applies retarded timing when the engine knocking occurs, thus gradually recovering the ignition timing for the knock control.

In the engine knocking, mixed gas in an engine combustion chamber is self-ignited and combusted for propagation of a flame inflamed from an ignition plug. When the knocking occurs, a pressure increase, which occurs by rapid combustion, vibrates a piston and a connector rod to generate noise. Since the vibration of combustion gas promotes heat transfer, overheat and burning of an electrode of the ignition plug or a piston occur when the vibration continues, thereby damaging the engine.

In order to solve the problem, in the related art, engine knocking is prevented by delaying an ignition time when there is a knock signal to gradually advance the ignition timing. However, since the ignition timing needs to be adjusted whenever the knocking occurs, it is impossible to automatically prevent the occurrence of the knocking.

In recent years, an engine control unit has been developed to store a knocking learning value (alternatively, a retarded timing learning value) so as to learn a retarded timing amount when engine knocking occurs. The ECU is configured further to retard the ignition timing when an engine keeps running under the same engine operating condition, and to recover the retarded timing when the knocking stops after a reference period of time elapses.

During controlling of the engine knocking as described above, after the knocking stops after the reference period of time, the engine needs to run for a predetermined time under the same operating condition as when the knocking occurs in order to recover the retarded timing. However, since it is difficult to maintain the engine running for the predetermined time with the same operating condition in an actual driving of a vehicle, for example, when a driving situation or a driving environment changes, it may be difficult to maintain the same operating condition.

For example, if a vehicle travels under a different engine operating condition before a reference period of time has reached, a time duration during which the vehicle travels under the engine operating condition in which the knocking occurs needs be reset.

Therefore, when the retarded timing amount is not recovered during the knock control during the engine running, an excessive delay of the ignition time occurs, thus decreasing an engine torque and deteriorating fuel efficiency.

The above information disclosed in this Background section is only for enhancement of understanding of the background of the invention, and therefore, it may contain information that does not form the prior art that is already known in this country to a person of ordinary skill in the art.

SUMMARY OF THE DISCLOSURE

The present disclosure has been made in an effort to solve the above-described problems associated with prior art. The present disclosure has been made in effort to provide a method for controlling engine knocking capable of preventing occurrence of an excessive ignition time delay by recovering the delayed ignition time under an engine operating condition in which the knocking occurs during engine running.

According to an exemplary embodiment of the present inventive concept a method for controlling engine knocking, in which a retarded timing is recovered based on an retarded timing amount learned when the engine knocking occurs during driving of a vehicle, includes a first process of retarding an ignition timing based on the previously learned retarded timing amount while driving under a reference engine operating condition. A second process recovers the retarded timing when a first condition in which a time duration acquired by accumulating a driving time in the reference engine operating condition is equal to or more than a reference time duration and a second condition in which the engine knocking does not occur while driving under the reference engine operating condition are satisfied.

When any one of the first and second conditions is not satisfied, a first average value which is an average value of a retarded timing amount in ignition-off after driving under a knocking occurrence possible condition and a second average value which is an average value of a retarded timing amount in ignition-on at an initial driving stage which is a state before driving under the knocking occurrence possible condition are compared with each other to advance the ignition timing in all engine operating conditions when the first average value is smaller than the second average value and retard the ignition timing in all engine operating conditions when the first average value is larger than the second average value.

When the ignition time of all of the engine operating areas is advanced or retarded, the ignition timing may be advanced or retarded based on a difference value between the first average value and the second average value. Or the ignition time may be advanced or retarded as large as a value acquired by multiplying the difference value between the first average value and the second average value by a predetermined subtraction rate.

A first subtraction rate when advancing the ignition timing because the first average value is smaller than the second average value and a second subtraction rate when retarding the ignition timing because the first average value is larger than the second average value may be different from each other.

The method for controlling engine knocking according to the present disclosure, an ignition timing is retarded based on a retarded timing learning value learned when the knocking occurs. Then, a driving time is accumulated whenever a vehicle is driven under the same engine operating condition in which the ignition timing is retarded, and as a result, when the accumulated driving time satisfies a reference time even if the vehicle is driven under a different engine operating condition, it is possible to recover the ignition time.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present disclosure will now be described in detail with reference to certain exemplary embodiments thereof illustrated in the accompanying drawing which is given herein below by way of illustration only, and thus are not limitative of the present disclosure, and wherein:

FIG. 1 is a flowchart of an operation of controlling engine knocking according to an embodiment of the present invention.

DETAILED DESCRIPTION

Hereinafter reference will now be made in detail to various embodiments of the present inventive concept. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents, and other embodiments, which may be included within the spirit and scope of the invention as defined by the appended claims.

Hereinafter, it will be described such that the present invention can be easily executed by those skilled in the art.

In general, when engine knocking occurs while driving a vehicle without a time limit in knock learning, retarded timing is applied and learned. However, it is difficult to recover the retarded timing when the knocking does not occur by applying the knock learning.

As mentioned above, in the related art, when the knocking does not occur after a predetermined period of time elapses in knock control, as a condition for recovering the retarded timing, an engine needs to run for a predetermined time under the same engine operating condition in which the knocking occurs. However, if the engine operating condition changes, the retarded timing may not be recovered.

Therefore, in the present disclosure, a driving time is counted and accumulated whenever driving a vehicle under an engine operating condition (alternatively, referred to as a learning operating condition) for learning retarded timing. When the counted time reaches a reference time, the ignition timing retarded by learning is recovered (restored).

Herein, an engine control unit (ECU) applies the retarded timing by learning and recovers the retarded timing.

FIG. 1 is a flowchart of an operation of controlling engine knocking according to an embodiment of the present invention.

In the ECU, an engine operating condition for the knock control is divided into multiple sections based on an engine revolutions per minute (RPM) and an engine load. Retarded timing learning value data and the like generated in each engine operating condition is stored in a corresponding cell among multiple cells configured in the ECU.

When the ECU detects engine knocking in a first engine operating condition, the retarded timing is learned when the knocking occurs. Here, a learned retarded timing amount (alternatively, the retarded timing learning value) is stored in a cell which corresponds to the first engine operating condition.

In addition, when the vehicle enters each engine operating condition according to an engine RPM and an engine load while driving the vehicle, the ignition timing is retarded as much as the retarded timing amount stored in the corresponding cell of the ECU to reduce knocking occurrence.

As such, the ignition timing is retarded based on the retarded timing amount which is previously learned under the first engine operating condition while driving the vehicle. Then, a first driving time during which the vehicle travels under the first engine operating condition is accumulated. When it is determined that the first driving time is equal to or more than a reference time and the knocking does not occur during the first driving time, the retarded timing is recovered.

That is, when the vehicle enters the first engine operating condition in which the retarded timing amount is learned by knock learning while driving the vehicle, the knocking occurrence is prevented by delaying the ignition timing based on the previously learned retarded timing amount. Here, when the first driving time accumulated under the first engine operating condition whenever driving the vehicle is equal to or more than the reference time without engine knocking, the retarded timing is advanced and recovered.

If the engine runs under a second engine operating condition from the first engine operating condition while recovering the retarded timing, a second driving time under the second engine operating condition during the retarded timing is counted and accumulated sequential to the first driving time rather than resetting the first driving time. Thus, the second driving time, which is accumulated from the first driving time, reaches a reference time under the second engine operating condition.

The second driving time under the second engine operating area is accumulated and stored in a cell of the corresponding engine operating condition in the ECU.

Here, the second driving time needs to be equal or more than a reference time without the knocking in order to recover the retarded timing.

If the second driving time is less than the reference time or the knocking occurs, the retarded timing may not be recovered.

Therefore, when the retarded timing is not recovered by the control, it may be forcibly recovered according to a result of comparing average values of the retarded timing amount in engine turn-on and engine turn-off.

In detail, if the vehicle travels under a knocking occurrence possible condition, a first average value A which is an average value of the retarded timing amount in ignition off (IG Off) and a second average value B which is an average value of the retarded timing amount in ignition on (IG On)

at an initial driving stage of the vehicle before driving under the knocking occurrence possible condition are compared with each other.

Herein, in the knocking occurrence possible condition, the vehicle is driven for a predetermined time under a condition in which an engine cooling water temperature is equal to or higher than a reference temperature (e.g., 80° C.). The average value of retarded timing amount means an average value of retarded timing amounts of engine operating conditions in which ignition timing is retarded by applying retarded timing learning when the knocking occurs.

According to the comparison result, when the first average value A is smaller than the second average value B, ignition timing for all engine operating areas is forcibly advanced regardless of the occurrence of the knocking, that is, without distinguishing an engine operating area in which the ignition timing is retarded and an engine operating area in which the ignition timing is not retarded. When the first average value A is larger than the second average value B, the ignition timing for all engine operating areas is forcibly delayed.

By forcibly advancing the retarded timing of all engine operating areas, the retarded timing is advanced and recovered in an operating area in which the ignition timing is previously retarded and the ignition time is advanced and controlled in an operating area in which the ignition timing is not previously retarded.

In this case, an ignition timing advance amount is determined and controlled based on a difference value (A–B) between the first average value A and the second average value B, or more specifically, by a value calculated by adjusting an application rate (alternatively, subtraction rate) of the difference value (A–B) according to a filter gain value.

That is, the ignition timing is advanced or retarded as large as a value calculated by multiplying the difference value (A–B) by the subtraction rate.

The subtraction rate may vary from 0 to 100% to reflect the difference value (A–B). For example, when the subtraction rate is 0%, the ignition timing advance amount or retard amount by the difference value (A–B) becomes '0', and when the subtraction rate is 100%, the ignition timing advance amount or retard amount becomes the difference value (A–B).

In addition, the subtraction rate when advancing the ignition timing because the first average value A is smaller than the second average value B and the subtraction rate when delaying the ignition time because the first average value A is larger than the second average value B may be set to be different from each other.

When the first average value A is smaller than the second average value B, the subtraction rate of the difference value (A–B) may be set to have a relatively large value in order to recover the ignition timing of the engine operating area in which the ignition time is previously retarded by advancing the ignition timing of all of the engine operating conditions. Since the ignition timing of all of the engine operating conditions is retarded regardless of the recovery of the retarded timing when the first average value A is larger than the second average value B, the subtraction rate of the difference value (A–B) may be set to have a relatively small value.

The knocking is controlled by reflecting the difference value (A–B) at the ignition timing of all of the engine operating conditions including the engine operating condition in which the retarded timing is not previously learned to prevent initial occurrence of the knocking and minimize engine torque deterioration by excessive retarded timing.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for controlling engine knocking, in which a retarded timing is recovered based on a retarded timing amount learned when the engine knocking occurs during driving of a vehicle, the method comprising:
    a first process of retarding the ignition timing based on the previously learned retarded timing amount during driving of the vehicle under a reference engine operating condition; and
    a second process of recovering the retarded timing when a first condition in which a time duration acquired by accumulating a driving time in the reference engine operating condition is equal to or more than a reference time duration and a second condition in which the engine knocking does not occur while driving in the reference engine operating condition are satisfied,
    wherein when any one of the first and second conditions is not satisfied, a first average value which is an average value of an retarded timing amount in ignition-off after driving under a knocking occurrence possible condition and a second average value which is an average value of an retarded timing amount in ignition-on at an initial driving stage which is a state before driving under the knocking occurrence possible condition are compared with each other to advance the ignition timing in all engine operating conditions when the first average value is smaller than the second average value.

2. The method of claim 1, wherein the ignition timing is retarded in all engine operating conditions when the first average value is larger than the second average value.

3. The knock controlling method of an engine of claim 1, wherein when the ignition timing is advanced in all engine operating conditions, the ignition timing is advanced based on a difference value between the first average value and the second average value.

4. The method of claim 1, wherein when the ignition timing is advanced in all engine operating conditions, the ignition timing is advanced as large as a value acquired by multiplying a difference value between the first average value and the second average value by a first subtraction rate.

5. The method of claim 2, wherein when the ignition timing is retarded in all engine operating conditions, the ignition timing is retarded based on the difference value between the first average value and the second average value.

6. The method of claim 2, wherein when the ignition time is retarded in all engine operating conditions, the ignition time is retarded as large as a value acquired by multiplying the difference value between the first average value and the second average value by a second subtraction rate.

7. The method of claim 2, wherein a first subtraction rate for advancing the ignition timing because the first average value is smaller than the second average value and a second subtraction rate for retarding the ignition timing because the first average value is larger than the second average value are different from each other.

* * * * *